United States Patent [19]

Ream et al.

[11] Patent Number: 4,902,519
[45] Date of Patent: Feb. 20, 1990

[54] LOLLIPOP-TYPE CONFECTION FORMED AND PACKAGED IN AN ELASTIC MOLD

[75] Inventors: Ronald L. Ream, North Aurora; David M. Moore, Wheaton, both of Ill.

[73] Assignee: Wm. Wrigley Jr. Company, Chicago, Ill.

[21] Appl. No.: 246,915

[22] Filed: Sep. 16, 1988

Related U.S. Application Data

[63] Continuation of Ser. No. 3,952, Jan. 16, 1987, abandoned.

[51] Int. Cl.4 .......................... A23G 3/00; A23G 3/12
[52] U.S. Cl. .......................................... 426/91; 426/5; 426/93; 426/103; 426/104; 426/110; 426/112; 426/134; 426/413; 426/414; 426/421; 426/515
[58] Field of Search ...................... 426/5, 90, 91, 104, 426/389, 100, 101, 421, 415, 414, 413, 130, 110, 103, 93, 112, 134, 515; D1/103, 104, 102, 105, 106, 110

[56] References Cited

U.S. PATENT DOCUMENTS

| | | | |
|---|---|---|---|
| D. 192,225 | 2/1962 | Coleman | 426/134 |
| D. 255,280 | 6/1980 | Anderson . | |
| D. 274,859 | 7/1984 | Harris et al. | 426/104 |
| 1,578,122 | 3/1926 | Higgins | 426/90 |
| 1,718,997 | 7/1929 | Burt | 426/91 |
| 1,720,190 | 7/1929 | Van Horne | 426/91 |
| 1,786,606 | 12/1930 | Gordon | 426/91 |
| 1,810,453 | 6/1931 | Webster et al. | 426/104 |
| 1,923,587 | 8/1933 | Robb | 426/91 |
| 1,947,872 | 2/1934 | Nolte | 426/110 |
| 2,001,919 | 5/1935 | Nolte | 426/130 |
| 2,019,740 | 11/1935 | Starkey | 426/104 |
| 2,048,364 | 7/1936 | Willems | 426/101 |
| 2,057,297 | 10/1936 | Fatland | 426/134 |
| 2,085,495 | 6/1937 | Fulkerson | 426/101 |
| 2,161,910 | 6/1939 | Callahan | 426/90 |
| 2,166,568 | 7/1939 | Kuhlke | 426/414 |
| 2,190,231 | 2/1940 | Craddock | 426/104 |
| 2,191,352 | 2/1940 | Oprean | 426/101 |
| 2,248,963 | 7/1941 | Copeman | 426/104 |
| 2,311,934 | 2/1943 | Dieter | 426/119 |
| 2,317,067 | 4/1943 | Knaust | 426/115 |
| 2,350,912 | 6/1944 | Marshall . | |
| 2,614,047 | 10/1952 | Turner | 426/91 |
| 2,674,960 | 4/1954 | De Pasquale | D1/102 |
| 2,677,615 | 5/1954 | Sueskind | 426/134 |
| 3,274,958 | 9/1966 | Otken | 426/91 |
| 3,654,746 | 4/1972 | Beckers | 426/108 |
| 4,001,440 | 1/1977 | Hoyt . | |
| 4,104,411 | 8/1978 | Pooler | 426/91 |
| 4,239,175 | 12/1980 | Straubinger | 426/134 |
| 4,350,712 | 9/1982 | Kocharian | 426/91 |

FOREIGN PATENT DOCUMENTS

| | | | |
|---|---|---|---|
| 527366 | 7/1956 | Canada | 426/110 |
| 2055646 | 5/1972 | Fed. Rep. of Germany | 426/90 |
| 2823320 | 12/1979 | Fed. Rep. of Germany | 426/134 |
| 2084846 | 4/1982 | United Kingdom | 426/134 |

Primary Examiner—Steven Weinstein
Attorney, Agent, or Firm—Willian Brinks Olds Hofer Gilson & Lione

[57] ABSTRACT

A lollipop-type confection is described which is molded and packaged in an elastic mold together with the method of making such a confection. After the molten candy product is poured through the opening of an elastic mold, the opening is sealed with a layer of chewing gum product. A handle in the form of a stick is also provided which stick passes through the layer of chewing gum product and into the candy product.

15 Claims, 2 Drawing Sheets

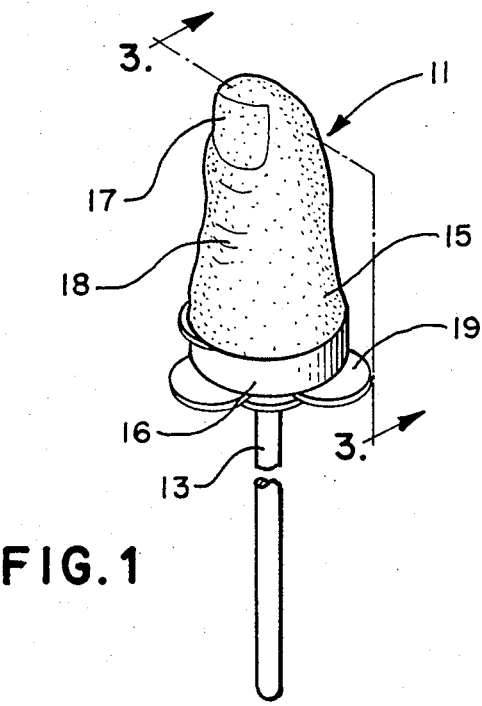
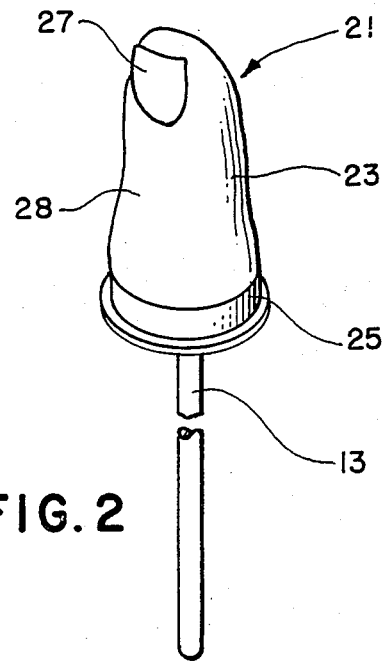
FIG.1  FIG.2
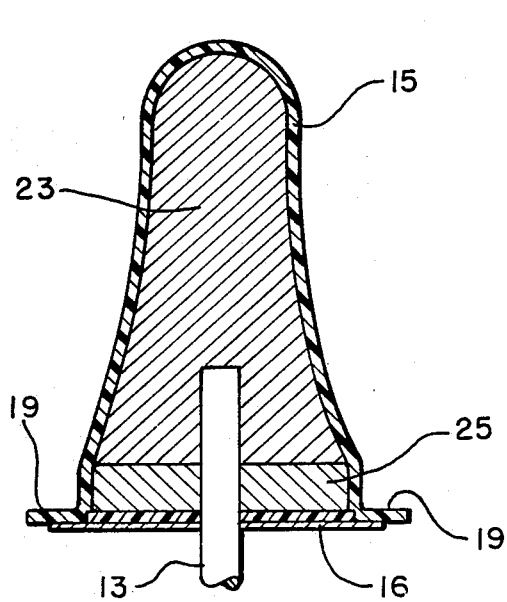
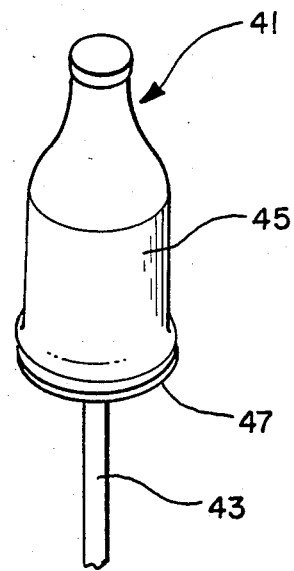
FIG.3  FIG.4

LOLLIPOP-TYPE CONFECTION FORMED AND PACKAGED IN AN ELASTIC MOLD

This application is a continuation, of application Ser. No. 07/003,952, filed 1/16/87, now abandoned.

BACKGROUND OF THE INVENTION

The present invention relates generally to confections. More particularly the invention relates to lollipop-type confections, that is a candy product on a stick.

The lollipop has been a popular form of confection for a number of years. Variations on the basic lollipop have appeared from time to time. Many different flavors of lollipops have been made from various types of confection compositions. For example, in addition to the traditional hard candy composition, i.e. a water soluble, non-chewable candy, lollipops have also been made out of taffy formulations, toffee formulations, and chocolate formulations.

In addition, many different shapes and sizes of lollipops have been made. Most often the shape of lollipops has been relatively simple, e.g. a flat disc or a sphere. Some have been formed into more complex shapes by pouring the molten candy into a mold which forms the front of the lollipop into the desired shape, such as a face, and which leaves the back of the lollipop flat.

One of the problems in molding lollipops with confections having low melting points is the fact that confection can lose part or all of the shape it has been given if the confection is subjected to temperatures above its melting point before consumption. This is typically a problem with chocolate lollipops.

One of the costs typically associated with producing lollipops is due to the fact that each lollipop must be wrapped in an individual package. In particular, when working with a water soluble candy product, it is important that the package provide a secure moisture barrier.

SUMMARY OF THE INVENTION

In general, the present invention is directed to a lollipop-type confection which is molded and packaged in an elastic mold as well as the method of making such a confection. After the molten candy product is poured through the opening of an elastic mold, the opening is sealed with a layer of chewing gum product. A handle in the form of a stick is also provided which stick passes through the layer of chewing gum product and into the candy product.

By way of definition, the term "candy product" as used in this specification and the appended claims is intended to refer to numerous types of candy products including but not limited to the following types of candy products: hard candy, taffy, toffee, nougat, caramel, and chocolate. The basic requirement of the candy product useful in this invention is that it is pourable when in a molten state and that it will harden as it cools.

Also by way of definition, the term "chewing gum product" as used in this specification and the appended claims is intended to refer to a masticatory substance which comprises a chewing gum base, a sweetener, and preferably a flavorant.

In accordance with a preferred embodiment of the invention, the mold is provided in the shape of a thumb and also includes a tab feature near the opening for facilitating removal of the mold from the confection. Also, the mold is preferably made the same color as the candy product so that the consumer knows the flavor of the confection by looking at it. The candy product in this preferred embodiment is a sugar-based hard candy product and the chewing gum product is a bubble gum.

In accordance with a preferred method of making the lollipop-type confection, a plurality of elastic molds are arranged in a two-dimensional array. Molten hard candy is deposited in each of the molds and the sealing layer of chewing gum product is deposited on top. A display means, such as a box, is provided with holes in an array similar to that which the molds are held in. A stick is placed in each hole. The display means with the sticks in place is held upside down over the array of molds and the sticks are inserted into all of the molds in one motion. After the hard candy and chewing gum product cool, the display means is turned rightside up and is ready to be used to display the lollipop-type confections in a retail setting.

This preferred method is advantageous because it allows the manufacturer to form several lollipops in a single process which lollipops are already held in a display case and are ready for shipment to the retailer who can market the lollipops by simply putting the display case on his shelf.

The use of an elastic mold to form a shaped lollipop is advantageous for at least two reasons. First, it allows one to make lollipops with relatively intricate shapes while still allowing for easy release of the lollipop from the mold. That is, because the mold is elastic, it can be stretched and therefore easily pulled away from the candy product. This is particularly important if the candy product is a hard candy which has become tacky during storage. A second advantage is the fact that the molds are suitable for packaging of the lollipops after manufacture. That is, the lollipops of the present invention can be sold right in their mold without additional packaging. Naturally, this reduces the cost of producing the lollipops.

Additionally, it has been found that some consumers, particularly younger ones, are attracted by the fact that they can keep the elastic mold after the lollipop is consumed. Moreover, some consumers, particularly older ones, have found it to be an advantage that the elastic mold can be used to cover a half-eaten lollipop if it is desired to save the unconsumed portion.

The present invention is further advantageous when the candy product has a relatively low melting point, e.g. chocolate. Because the confection is packaged and marketed in the elastic mold, and because the mold is sealed by the chewing gum layer, the confection will retain the desired shape even if it has been temporarily subjected to temperatures above its melting point. For example, even if a chocolate lollipop is melted during shipping, the chocolate will re-harden in the desired shape when it is cooled again.

The use of a chewing gum product to seal the elastic mold is also advantageous because it provides a simple and secure method for sealing the candy product from the external environment. The fact that it is a secure seal is advantageous whenever it is important to prevent the candy from coming into contact with moisture present in the environment, e.g. a hard candy. It is also highly advantageous that this sealing layer can be chewed by the consumer when the candy is gone.

These and other advantages of the present invention will become apparent from the following description which, when taken in conjunction with the accompanying figures, discloses presently preferred embodiments of the present invention.

BRIEF DESCRIPTION OF THE DRAWINGS

FIG. 1 is a perspective view of a preferred embodiment of the present invention;

FIG. 2 is a perspective view of the embodiment of FIG. 1 without the elastic mold;

FIG. 3 is a cross-sectional view taken along line 3—3 of FIG. 1;

FIG. 4 is a perspective view of an alternative embodiment;

DETAILED DESCRIPTION OF THE PRESENTLY PREFERRED EMBODIMENTS OF THE INVENTION

Figure 5:
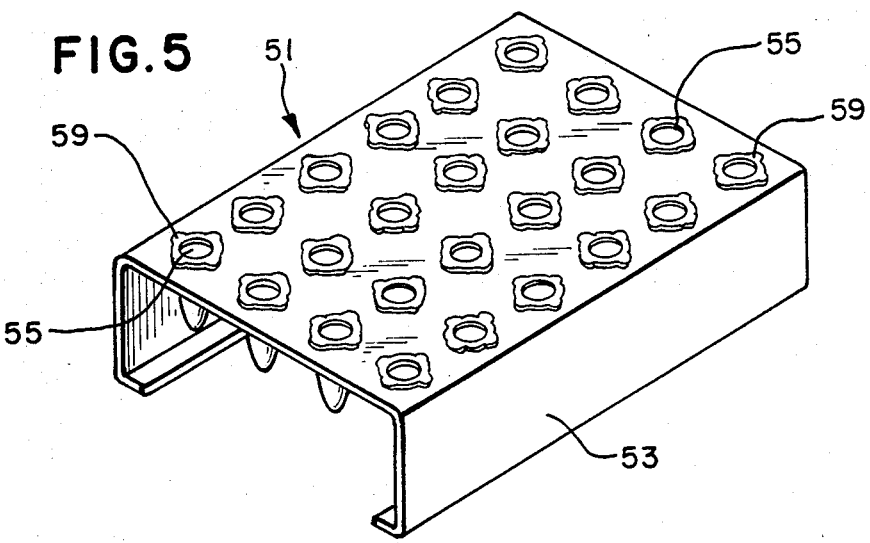
FIG. 5 is a perspective view of a jig for use in the preferred method of making the present invention.

Referring to the drawings, FIG. 1 is a perspective view of the preferred embodiment of the lollipop-type confection 11 of the present invention. In this view, the elastic mold 15 covers the candy product 23 which is shown in FIG. 2. In this preferred embodiment, the mold 15 is provided in the shape of a thumb, i.e. a human thumb, and includes details such as a nail 17 and creases 18 at the knuckle. This thumb shape has been found to be popular with consumers.

Other shapes can be used for the elastic mold. For example, as shown in FIG. 4, the elastic mold 45 can be provided in the shape of a pop bottle. Such a shape would be particularly desirable if the candy product is made with a flavor similar to a popular soft drink like root beer etc.

Other shapes which can be made include but are not limited to the following: cars or rockets, generic human or animal figures, heads or figures of popular animated characters, heads or figures of actual people, etc. It should be noted that because the mold is elastic, the range of shapes is not limited to those which decrease in diameter toward the distal end of the lollipop. That is, it is possible to make figures, such as human heads, light bulbs, etc., which are enlarged toward the distal end.

Preferably, the mold is relatively thin so that the outside surface of the mold is generally similar to the internal surface. In this way, the lollipop in its package looks similar to what it will look like with the mold is removed. Alternatively, the mold has a different shape on its outer surface than it does on its inner surface.

An important property which the mold should have is sufficient elasticity so that it can be pulled off the candy by the consumer. The exact degree of elasticity required will depend on the shape selected, i.e. whether the opening is smaller than the largest cross-section of the lollipop. In addition, the elastic mold should have sufficient ability to retain its shape so that it can reliably impart shape to the candy as it cools. Naturally this elasticity and shape retention will depend on the specific elastic material chosen as well as the thickness of the mold. It is considered to be within the knowledge in the art to select such a material and thickness.

The elastic mold 15 in this embodiment is about 0.1" thick and is made from a blend of "Craton" thermoplastic rubber obtained from the Shell Oil Co. Specifically, the most preferred blend consists of about 30 weight percent Craton G2705 and about 70 weight percent Craton G2706. It is selected for this preferred embodiment based on its elasticity and shape retention. It is also selected because it can withstand the relatively high temperatures encountered when the molten hard candy product is poured into the mold. In particular, the molten candy will typically be at a temperature of about 270° F. Accordingly, when the candy product must be deposited at such high temperatures, it is important that the elastic material chosen for the mold be able to withstand such high temperatures.

Other factors in selecting the material for the elastic mold is the color and texture of the material. In particular, because the mold will be used for packaging, it is important that it have an attractive color and texture. In the most preferred embodiment the material is colored with the same general color as that of the candy. In this way, the consumer has a visual indication of the flavor of the candy product within, e.g. purple for grape, red for cherry, etc. Alternatively, the material can be translucent so that the color of the candy can be viewed through the elastic mold. In still other alternative embodiments, the elastic mold can be made from multiple colors, or printed with multiple colors, so as to better simulate whatever object is desired.

As shown in FIG. 1, the elastic mold 15 preferably includes tabs 19 which can be gripped by the consumer to facilitate removal of the mold from the candy product.

The most preferred embodiment also includes a cover 16 which has a hole through which the stick 13 passes. Preferably, the cover is a simple paper disc which has advertising and/or labeling information printed thereon.

Referring to FIG. 2, it is seen that the hard candy product of the most preferred embodiment has been molded in such a way so as to take on the details of a human thumb, i.e. a nail 27 and wrinkles 28 at the knuckle. This ability of the present invention to impart intricate shapes is an important advantage in allowing the manufacturer to produce novel and popular shapes. However, the designs themselves form no part of the present invention.

By way of definition, the term "hard candy product" as used in this specification and the appended claims is intended to refer to a relatively hard (i.e. non-chewable), water soluble candy product.

The hard candy product used in the preferred embodiments of this invention is made by numerous well known techniques and has numerous well known compositions. The only requirement of the hard candy product is that it is pourable in a molten state and that it will harden as it cools.

As a preferred example, the hard candy product comprises about 60 weight percent sucrose and about 35 weight percent corn syrup. This mixture is boiled at about 300° F. until the water content of the mixture is between about 3 and about 5 weight percent. Other ingredients such as vegetable fat, flavorants, acidulants, and colorants are added to provide the desired properties of the hard candy product.

It is an advantage of the present invention that a higher than normal level of acidulant can be used in the candy of this invention. In particular, the level of added acid is typically kept low enough to avoid causing inversion of the sucrose in the candy, which inversion results in increased tackiness in the candy. However, since the elastic mold can be stretched and easily pulled away from the candy product of this invention, a higher than normal level of acidulant can be used. For example, in the most preferred embodiment, 1.5 weight percent lactic acid is used, whereas it is the inventors' experience that level is typically kept at 1.0 weight percent and below in conventional hard candy products. Levels above 1.5 weight percent are also possible with the present invention.

Although a hard candy product is currently preferred, other types of candy are also useful in the present invention. For example, taffy, toffee, nougat, caramel, and chocolate can all be used as the confection for the lollipop of this invention. As used herein, the term "chocolate" is intended to refer to various forms of natural chocolate as well as white chocolate, and compound coating, i.e. imitation chocolate. As stated above, the basic requirement of the candy product useful in this invention is that it is pourable in a molten state and that it will harden as it cools. Because the elastic mold can be easily removed from sticky candy product, it is possible to put certain types of candy products on the lollipop of this invention that would normally cause problems with wrapper removal, e.g. taffy or caramel.

Another important advantage is provided by the invention when chocolate, or other low melting candies, is selected as the confection for the lollipop. In particular, because typical chocolate formulations melt at relatively low temperatures, it is not uncommon for the chocolate to experience some melting or softening between the time it is manufactured and the time it is consumed. With the present invention, the chocolate lollipop would not lose its desired shape because the mold is still surrounding the chocolate and because the bottom of the mold is sealed with the chewing gum product. That is, as long as the product is cooled before consumption, the chocolate will have the desired shape when the elastic mold is removed.

As an alternative to a sugar-based candy, a sugarless product can also be used. For example, a sugar alcohol, such as a 95 percent sorbitol solution, can be used. Additionally, the candy product can be made with hydrogenated starch hydrolysate, aspartame, etc.

As can be seen in FIGS. 2 and 3, adjacent to the candy product 23 is a sealing layer 25. This layer 25 is made from a chewing gum product. The chewing gum product used in the invention is preferably a bubble gum, i.e. a film forming type gum. Most preferably, the sealing layer is about 0.125" thick.

This layer of chewing gum product 25 serves the important function of closing off the opening in the elastic mold so that the candy product is protected from the external environment. In particular, the sealing layer acts as a moisture barrier. This is important because most candy compositions can become quite tacky if it comes into contact with moisture.

The secure seal is also beneficial when the candy used has a relatively low melting point. That is, it is advantageous that the chewing gum seal will keep the confection within the mold even if it becomes liquified.

It is also advantageous that the layer 25 serves two purposes, namely to seal the opening and to provide chewing gum to be chewed by the consumer. It is further advantageous that the sealing layer thus has a ready means of disposal.

At present, it is preferred to deposit the sealing layer of chewing gum product by pouring molten chewing gum product on top of the candy product. When doing so, it is important that the molten chewing gum product have a sufficiently low viscosity so that it can flow well enough to level out over the top of the candy product and thereby seal the entire opening. Such a low viscosity molten chewing gum product can be obtained by adding softeners to standard types of chewing gum product. Preferred softeners are waxes, oils, and lecithin. Thus, as a preferred example, a commercially available bubble gum base can be modified by adding 15 weight percent paraffin with a melting point of about 155° F., about 2 weight percent lecithin, and about 2 weight percent glycerol monostearate.

Sweeteners, flavorants, and colorants are also preferably added to the chewing gum base to obtain the chewing gum product for the sealing layer. Most preferably, the sweetener selected is a nonhygroscopic sweetener. That is, it is desirable that the sweetener not absorb significant amounts of water so that the chewing gum product can act as a better moisture barrier for the candy product. The nonhygroscopic sweetener is preferably selected from the group consisting of aspartame, alitame, acesulfame K, saccharin and its salts, cyclamic acid and its salts, as well as mixtures thereof.

The lollipop-type confection of the present invention also includes a stick 13. Preferably, this stick is a simple rolled paper stick such as that commonly used for lollipops. Alternatively, the stick can be made from plastic or wood. Also, although the simple cylindrical shape is preferred, other shapes can be used in alternative embodiments. For example, the non-rigid loop used for "safety suckers" can be used. The stick may also be given a fairly intricate shape that would compliment the shape of the candy product. For example, a human body shape can be used with a head-shaped candy portion. All of these variations are considered to be within the term "stick" as used in this specification and the appended claims.

Referring to FIG. 5, the most preferred method of the present invention includes the step of providing a plurality of elastic molds 55. Naturally, the rubber molds are oriented with their opening towards the top. Preferably, the molds are held in a two-dimensional array. This can be accomplished by using a jig 53 with holes provided in the proper places.

The jig 53 with the molds is preferably passed under an apparatus with multiple outlets adapted to deposit a sufficient quantity of the molten candy into each of the elastic molds. After the candy is deposited, a quantity of a molten chewing gum product is deposited by a similar multiple outlet apparatus over the top of the candy. This is preferably done while the candy is still molten. Alternatively, it can be done after the candy cools.

Figure 6:
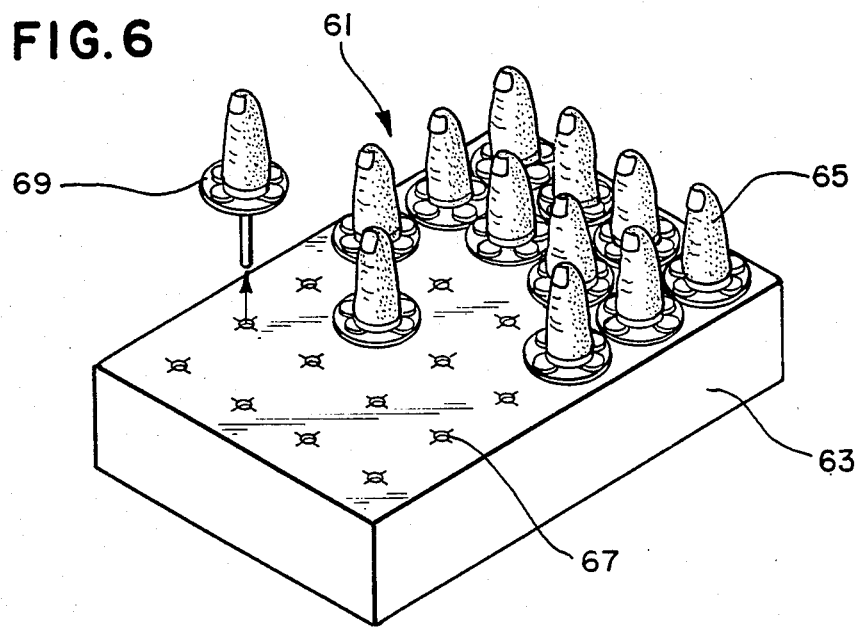
FIG. 6 is a perspective view of a display rack for the preferred embodiment of the present invention.

In the most preferred embodiment the sticks are inserted into molds by providing the sticks already in a display box such as that shown in FIG. 6. The sticks are inserted into holes in the display box which are in an array similar to the array of the jig 53. The display box 63 is then placed upside down over the array of molds and the sticks are inserted into each of the molds. Naturally, it is desirable to configure the holes so that the sticks will not fall out when turned upside down. In addition, it is desirable that the holes be configured so that the stick will remain perpendicular to the top of the display box. This can be accomplished by providing a card within the display box which has a similar array of holes in it.

Preferably, if covers 69 are used, they will be in place on the sticks at this point so they will be in place when the process is finished.

After the candy and the chewing gum products cool, the display box is turned rightside up again and now contains several lollipops. The display box 67 is ready to be used by the retailer to market the lollipops. Preferably, the manufacturer uses means such as a shrink wrap or a paperboard carton to retain the lollipops in the display box during shipment.

EXAMPLE

A non-limiting example of the preferred embodiment will now be described.

Twenty-four thumb-shaped elastic molds were provided in a jig such as that shown in FIG. 5, i.e. in a 4×6 array. The molds were made from the blend of Craton rubbers referred to above and were about 0.1" thick. In this example, the molds were colored purple because the hard candy product was grape flavored.

A hard candy product was made in the following way. About 50 pounds of water were placed in a steam jacketed vessel. About 230 pounds of fine granulated sucrose was added and mixed while the temperature was gradually increased. About 160 pounds of corn syrup (Staley Co. as #7350) was added and the mixing and heating continued until the temperature was about 190° F.. After dissolution of the sucrose and corn syrup, 8 pounds of vegetable fat (Shasta Fat for hard candy formulations) and 1 pound of soy lecithin were added and mixed. At this point, the mixture was fed into an inline concentrator (Groen Candy Concentrator) wherein it was heated to about 300° F. until the water content was reduced to between 3 and 5 weight percent. The mixture was then cooled and maintained at about 270° F. and the following ingredients were added inline: 1.5 weight percent lactic acid, 0.5 weight percent flavor (grape, Firmenich Co. #250-50-04), and 0.004 weight percent FD&C blue #2, and 0.005 weight percent FD&C red #40. The resultant molten hard candy product was deposited in the elastic molds by an apparatus with 24 outlets.

A bubble gum product for the sealing layer was made in the following way. About 80 weight percent of a commercially available bubble gum base (L.A. Dreyfus Co., LADCO-T) was mixed with about 15 weight percent paraffin (m.p. 155° F.), 2 weight percent lecithin, and 2 weight percent glycerol monostearate. Sodium saccharin at about 0.15 weight percent was used as a sweetener. About 0.8 percent flavor was added, namely "08L Fruit Bubble" from Felton Co. About 0.05 weight percent of FD&C red #3 was added as the colorant. This chewing gum product was heated to about 270° F. and deposited on top of the molten hard candy product by a similar apparatus. The resultant chewing gum product layer was about 0.125" thick.

A display box such as that shown in FIG. 6 was provided with 24 rolled paper sticks in its holes and paper discs inserted over each stick. The box was held upside down over the jig and the sticks were inserted into the molten hard candy and chewing gum products in one motion. The hard candy and chewing gum product were allowed to cool and the display box and jig were turned over. The jig was removed thereby leaving a display box filled with 24 lollipops.

It should be born in mind that although much of the discussion has involved the use of a hard candy product, other types of candy are useful in the present invention. Also, although thumb-shaped molds have been described as preferred, other shapes are certainly contemplated and considered within the scope of the invention. In addition, although the method has been described in connection with a particularly preferred embodiment, variations are clearly within the scope of the method. Certainly, these and other modifications which are within the ordinary skill in the art to make are considered to lie within the scope of the invention as defined by the following claims.

We claim:
1. A lollipop-type confection comprising:
an elastic mold with an opening and an internal surface;
a water soluble candy product which is contained in and has hardened within the elastic mold so that the product has a shape conforming to the internal surface;
a continuous layer of chewing gum which layer of chewing gum is contained in and has hardened within the opening of the elastic mold such that one side of said gum is adjacent to the candy product and the opposite side of said gum is exposed to air, and such that said layer of chewing gum is adhered to the elastic mold along the entire perimeter of the opening to completely close the opening and seal the candy product within the elastic mold and to provide a moisture barrier for said candy product; and
a stick which passes through the layer of chewing gum and into the candy product;
said chewing gum comprising sweetener, said sweetener consisting essentially of a non-hygroscopic sweetener so that the sweetener will not absorb significant amounts of water and interfere with the moisture barrier;
said mold having sufficient elasticity so that it can be pulled off said candy product and sufficient ability to retain its shape so that it can impart its shape to said candy product.

2. The invention of claim 1 wherein the candy product is a hard candy product.

3. The invention of claim 1 wherein the candy product is molded in the shape of a pop bottle.

4. The invention of claim 1 wherein the candy product contains chocolate.

5. The invention of claim 1 wherein the elastic mold has an external surface of generally the same shape as the internal surface.

6. The invention of claim 5 wherein the candy product is molded in the shape of a human thumb.

7. The invention of claim 1 wherein the candy product is molded in the shape of a human thumb.

8. The invention of claim 7 wherein the color of the elastic mold is generally flesh colored.

9. The invention of claim 1 wherein the candy product is molded in the shape of a pop bottle.

10. The invention of claim 1 wherein the color of the elastic mold is selected so as to be generally the same color as that of the candy product.

11. The invention of claim 1 wherein the elastic mold is generally translucent whereby the color of the candy product may be viewed through the elastic mold.

12. The invention of claim 1 wherein the elastic mold comprises tab means near the open end to aid in removing the elastic mold from the candy product.

13. The invention of claim 1 wherein the chewing gum is bubble gum.

14. The invention of claim 1 wherein the nonhygroscopic sweetener is selected from the group consisting of aspartame, alitame, acesulfame K, saccharin and its salts, cyclamic acid and its salts, as well as mixtures thereof.

15. The invention of claim 1 further comprising a cover means which is placed across the open end of the elastic mold and which includes a hole through which the stick passes.

* * * * *

Disclaimer 4,902,519.—*Ronald L. Ream*, North Aurora; *David M. Moore*, Wheaton, both of Ill. LOLLIPOP-TYPE CONFECTION FORMED AND PACKAGED IN AN ELASTIC MOLD. Patent dated Feb. 20, 1990. Disclaimer filed June 1, 1992, by the assignee, Wm. Wrigley Jr. Co.

Hereby enters this disclaimer to claims 6 and 7 of said patent.